(12) United States Patent
Oglesbee

(10) Patent No.: US 6,246,214 B1
(45) Date of Patent: Jun. 12, 2001

(54) MULTIPLE USE OF A SINGLE TRANSISTOR FOR LINEAR REGULATION CHARGE CONTROL AND PROTECTION OF A RECHARGEABLE BATTERY

(75) Inventor: John Wendell Oglesbee, Watkinsville, GA (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/619,122

(22) Filed: Jul. 19, 2000

Related U.S. Application Data

(60) Provisional application No. 60/203,896, filed on May 10, 2000.

(51) Int. Cl.[7] ............................................. H02J 7/00
(52) U.S. Cl. ................................................... 320/136
(58) Field of Search ..................... 320/130, 134, 320/136

(56) References Cited

U.S. PATENT DOCUMENTS 6,137,265 * 10/1998 Cummings et al. ................ 320/136
6,160,381 * 10/1998 Peterzell .............................. 320/136

* cited by examiner

Primary Examiner—Peter S. Wong
Assistant Examiner—Pia Tibbits
(74) Attorney, Agent, or Firm—Philip H. Burrus, IV

(57) ABSTRACT

A battery charging and protection circuit that features a single transistor to control current flow in two directions. The circuit comprises first and second input terminals to which a charging current is coupled, wherein a voltage between the first and second input terminals is limited to a maximum value. The circuit has first and second output terminals to which at least one rechargeable battery cell is coupled. A single transistor is coupled in series between the first input terminal and the first output terminal and is operated to control current flow both in a direction from the first input terminal to the first output terminal, and in a direction from the first output terminal to the first input terminal.

14 Claims, 3 Drawing Sheets

MULTIPLE USE OF A SINGLE TRANSISTOR FOR LINEAR REGULATION CHARGE CONTROL AND PROTECTION OF A RECHARGEABLE BATTERY

This application claims priority to U.S. Provisional Application No. 60/203,896, filed May 10, 2000.

FIELD OF THE INVENTION

The present invention is directed to battery charging technology, and more specifically to the use of a safety field effect transistor (FET) to regulate charging of a rechargeable battery.

BACKGROUND OF THE INVENTION

There is a universal problem associated with rechargeable battery systems known as the "key chain" problem. It is known as the "key chain" problem because when a battery with exposed terminals is placed in a pocket of a user, any conductive object, such as a key chain for example, that comes in contact with the terminals can provide a short circuit. Such a short circuit can produce large currents that may cause the key chain or other conductive object to increase in temperature.

To prevent such a phenomenon from occurring, prior art battery systems have typically included a series element, such as a fuse or positive temperature coefficient (PTC) resistor, coupled between one external terminal and the cell. When large currents flow, either the fuse clears or the PTC becomes an open, thereby stopping the flow of current.

More modern systems employ transistors coupled in series between a terminal and the cell. FIG. 1 shows such a prior art system. In the prior art system of FIG. 1, it may be necessary to protect the battery cell from excessive current flow in either direction. For example, a "key-chain" short between terminals 108 and 109 may cause too much current flow in the cell discharge direction, with excessive current flowing from cell terminal 101 to the external terminal 108. Also, a cell may be overcharged from too much current flow in the cell charge direction, with excessive current flowing from the external terminal 108 to the cell terminal 101. To protect against excessive current flow in both directions two field effect transistors (FETs) are used due to the parasitic diode component associated with each. When power semiconductor FETs are manufactured, the body substrate, coupled with the method of manufacture create a parasitic diode. Referring to FIG. 1, diode 102 is a parasitic diode component of transistor 103.

This parasitic diode causes problems in battery circuit designs. While transistor 103 can prevent current from flowing from the cell 101 to the positive terminal 108, the transistor 103 cannot prevent current from flowing in the opposite direction due to the diode. In other words, if transistor 103 is open, and diode 102 becomes forward biased, current will flow through the diode 102.

To prevent bidirectional current flow, designers must use another transistor 106 that has its parasitic diode 107 aligned in the opposite direction. In such a fashion the charging transistor 106 opens to prevent current from flowing from the terminal 108 to the cell 101, and the discharge transistor 103 opens to prevent current from flowing from the cell 101 to the terminal 108. In each case, the parasitic diode is reverse biased preventing current flow.

In addition, as known in the prior art, transistor 106 may be used to regulate current flow in the charge direction. In this case, the FET 106 is used in its linear ohmic operating mode to adjust the desired charging current. A charge regulator system 105 may be used to accomplish this operation, as is common in the art. Likewise, transistor 102 may be used to regulate current flow in the discharge direction, with the FET 102 used in its linear ohmic operating mode to adjust the desired discharge current. A discharge regulator system 104 may be used to accomplish this operation, as is common in the art. The linear ohmic operating mode is understood herein to include also the states where the transistor being controlled may be completely "on" (saturated), or completely "off" (cutoff), or the transistor may be in any ohmic conduction region between these extremes. Because of the prior art application and usage of these two transistors, transistor 106 may be typically referred to as the "Charge FET," and transistor 102 may be typically referred to as the "Safety FET."

The use of two transistors to regulate and control cell current flow in either direction from a battery cell is an expensive and bulky solution to the problem of cell safety protection. There is a need for an improved battery circuit to provide a charging system that reduces the number of components and complexity of the circuit, and still provides desirable safety features.

DETAILED DESCRIPTION OF THE INVENTION

The present invention utilizes the existing two quadrant operating characteristics of a single safety transistor (such as an FET) to accomplish complete control of both charging and discharging currents of a battery cell or cells. To successfully accomplish the two quadrant operating characteristics of the single safety transistor, an appropriate voltage limiting means is used in either the charging or safety protection systems. Several appropriate voltage limiting means are described for use with the present invention. A single transistor to control cell current in both directions is less costly and bulky than prior art systems that use two transistors for this purpose.

This invention uses a safety transistor to control current flow in two directions. This is achieved by limiting the difference between the input voltage to the battery charging circuit and the battery cell voltage to a maximum value. This voltage difference is herein called $\delta_v$. As long as $\delta_v$ is below the conduction threshold voltage of the parasitic diode of the safety transistor, the safety transistor coupled in series with the battery cell may adequately prevent current flow in either direction by exploiting two quadrants (quadrants I and III) of operations of the safety transistor.

Figure 1:
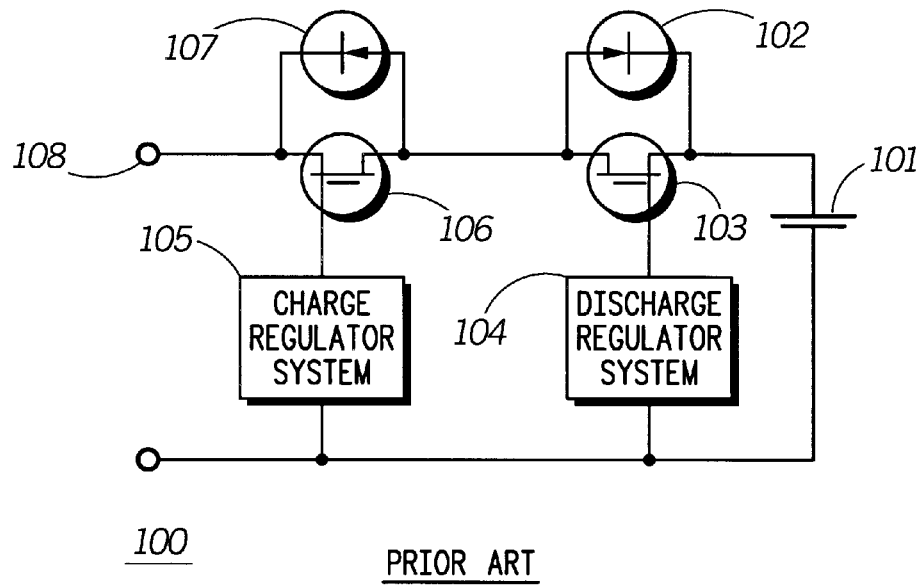
FIG. 1 is a schematic diagram of prior art charging systems.
Figure 2:
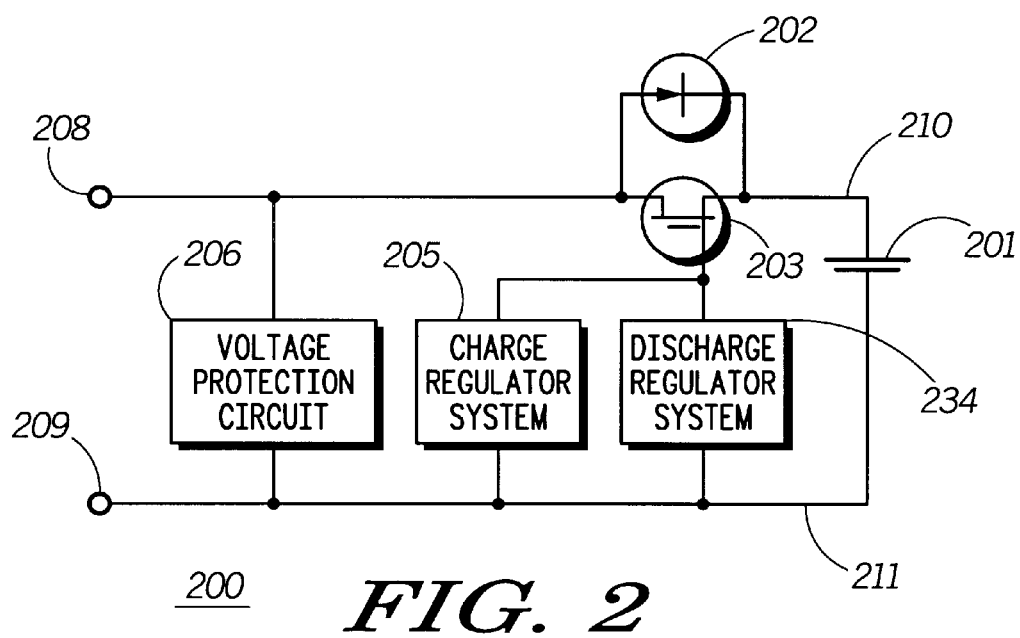
FIG. 2 is a schematic diagram of a battery circuit in accordance with one embodiment of the invention.

One embodiment of a battery pack safety protection and charging circuit according to the invention is shown generally at reference numeral 200 in FIG. 2. The circuit 200 and a battery cell (or cells) are typically integrated into a user friendly battery pack assembly. The circuit 200 has input terminals 208 and 209 that connect to a battery charger (not shown) and output terminals 210 and 211 that couple to a battery cell 201. A single transistor 203, such as a field effect transistor (FET), is connected in series between the input terminal 208 and the output terminal 210 such that one pole is coupled to input terminal 208 and the other opposite pole is coupled to output terminal 210 of the battery cell 201. The transistor 203 may be a n-channel or p-channel FET so that the poles of the transistor 203 may be either a drain or source as is well known in the art.

In the embodiment shown in FIG. 2, a voltage protection circuit 206 limits the voltage at the input terminals 208 and 209 to a maximum value (VMAX). Charge regulator system 205 is coupled to the transistor 203 to control the transistor 203 during charging operations. A discharge regulator system 204 is coupled to the transistor 203 to control (regulate, restrict or limit) discharge current that would flow through the transistor 203 whenever any condition is sensed in which it may be desirable to control discharge current.

The transistor 203 has a parasitic diode component shown at reference numeral 202 in parallel with the transistor 203. The anode of the parasitic diode 202 is coupled to the input terminal 208 and its cathode is coupled to the output terminal 210 that connects to the battery cell 201. The transistor 203 is often referred to as a safety transistor because it provides safety protection in the event of over-current or other discharge conditions. The design of the transistor 203 may be optimized by silicon doping or other means in such a manner so as to maximize its parasitic diode forward characteristics to extend its useful operating range for bi-directional current control.

The charge regulator system 205 and the discharge regulator system 204 may take on one of a variety of forms well known in the art. For example, the discharge regulator system 204 may comprise a low value resistance coupled in series between the battery cell and the input terminals. An amplifier is included that monitors the voltage across the resistor. When the voltage becomes too large, the amplifier controls the transistor 203 to decrease the amount of (or totally inhibit) the discharge current.

Figure 3:
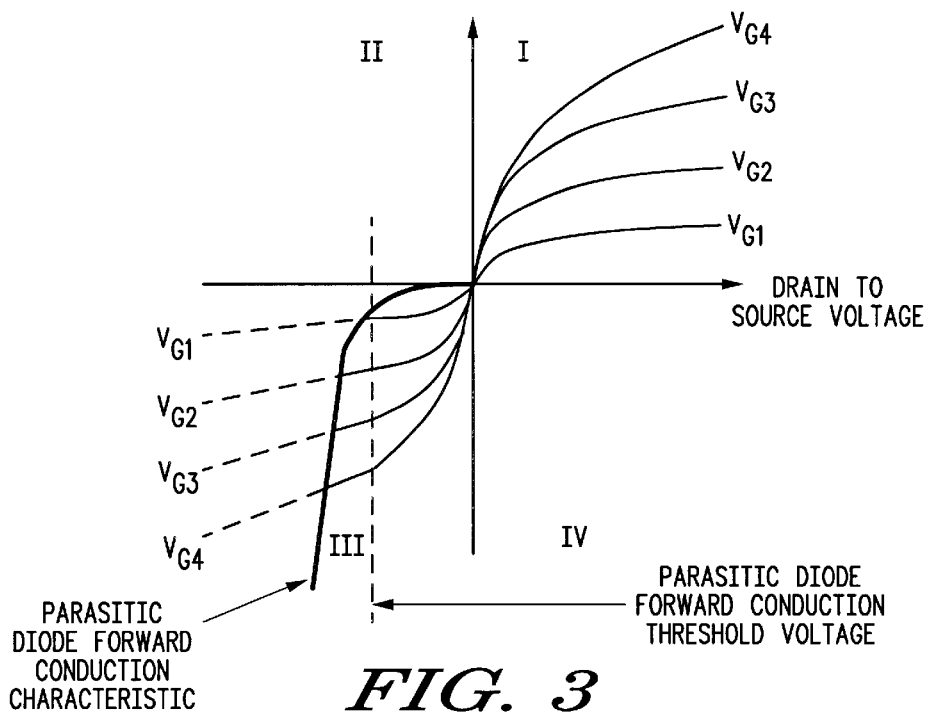
FIG. 3 is a graphical diagram showing the quadrants of operation of a transistor according to the present invention.

FIG. 3 illustrates a customary format for the characteristic curves of a representative n-channel FET. These curves show that relationship of drain current to drain-to-source voltage for different values of gate voltage. A p-channel FET would have similar characteristics, but the direction axes, polarity conventions, and the definition of quadrants may be different.

Returning to FIG. 2, the voltage protection circuit 206 intrinsically limits the voltage between the terminals 208 and 209 to a predetermined maximum value. For example, in a single battery cell charging system, this voltage may be 4.5 volts. The optimum cell voltage for a fully charged lithium battery is around 4.25 volts. Therefore, the difference ($\delta_v$) between the voltage applied to the terminals 208 and 209 and the voltage of a fully charged battery cell is limited to 0.25 volts. The typical conduction voltage for a parasitic diode in power transistors (e.g., FETs) is about 0.5 volts. Thus, with a voltage protection circuit 206 in place, the parasitic diode 202 will never reach the conduction state, thereby allowing the transistor 203 to completely control current flow in two directions by exploiting operation characteristics of the transistor 203 in quadrants I and III as shown in FIG. 3.

For example, if an external short is placed across the terminals 208, 209, the discharge regulator system 204 senses high levels of discharge current (current flowing from one of the output terminals 210, 211 to one of the input terminals 208, 209) and if the current exceeds a threshold, it generates a signal coupled to the gate of the transistor 203 causing it decrease (or totally inhibit if the transistor 203 is put into an open-circuit) the discharge current flowing therethrough from the terminal 210 to the input terminal 208. When the transistor 203 is in this mode, the battery cell voltage at the cathode of the parasitic diode 202 would be higher than the voltage at the terminal 208, causing the parasitic diode 202 to be reverse-biased. When the parasitic diode 202 is reversed biased, current flow through it from the battery cell 201 to the input terminals 208 is prevented or at least significantly restricted. In this mode, the transistor 203 is operated according to characteristics in quadrant I shown in FIG. 3. Overcurrent is one example of a condition that is sensed by the discharge regulator system 204. In general, the discharge regulator system 204 controls discharge current (current flowing from the first output terminal 210 to the first input terminal 208) by controlling transistor 203 whenever any condition is sensed in which it may be desirable to control (regulate, restrict or limit) the discharge current. Examples of conditions which may be sensed include, but are not limited to, battery cell overcurrent, battery cell short circuit, battery cell overtemperature, battery cell undervoltage, or any combination of these or other conditions. Furthermore, the discharge regulator system 204 may control the transistor 203 to operate it in its linear ohmic, saturated or cutoff region depending on discharge conditions.

When the circuit 200 is operating normally, the voltage protection circuit 206 limits the input voltage between terminals 208, 209 to a maximum value, like 4.5 volts. The charge regulator system 205 is therefore able to control or regulate current flowing from the input terminal 208 to the output terminal 210 coupled to the cell 201 by operating the transistor 203 in its linear ohmic region, its saturated region or cutoff region, as may be required by the charge regulator system 205. The parasitic diode 202 never conducts because there is never enough voltage at its anode to cause it to become forward biased. Thus, the transistor 203 controls current flow in two directions, thereby reducing the need for redundant components. In this mode, the transistor 203 may be operated according to characteristics in quadrants I or III shown in FIG. 3.

Figure 4:
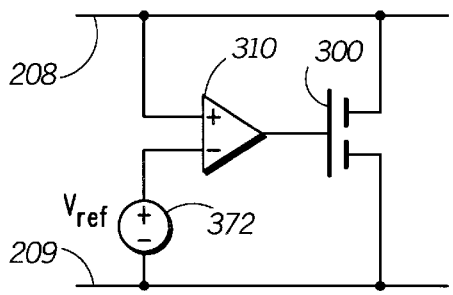
FIG. 4 is a schematic diagram of a voltage protection circuit useful in connection with the embodiment of the invention shown in FIG. 2.

FIG. 4 illustrates one example of a voltage protection circuit useful in connection with the present invention. The voltage protection circuit shown in FIG. 4 is a voltage regulator that comprises a transistor 300 (such as a metal oxide FET) and an amplifier 310. One input of the amplifier 310 is coupled to a voltage reference 312 and the other input is coupled to terminal 208. The output of the amplifier is a function of a voltage difference between the terminal 208 and the voltage reference 312 and drives the gate of the transistor 300. Additional optional elements of the voltage regulator include a thermal sensing circuit that includes a switch coupled between the gate of the transistor 300 and terminal 208 and a thermal sensing element that is thermally coupled to the amplifier 310. The thermal sensing element drives the switch. Further details of the voltage regulator shown in FIG. 4 are disclosed in co-pending U.S. application Ser. No. 09/545,135, filed Apr. 7, 2000, entitled "Shunt Voltage Regulator With Self-Contained Thermal Crowbar Safety Protection," the entirety of which is incorporated herein by reference. The circuit shown in FIG. 4 operates by adjusting a current that bypasses between terminals 208 and 209. For example, when an unusually high voltage is detected across the terminals 208 and 209, the voltage regulator increases the current in transistor 300, thus bypassing additional current from terminal 208 to terminal 209. This reduces the voltage between the terminals 208 and 209, and thus controls the voltage between those terminals.

Other voltage protection/limiting circuits that may be suitable for use in connection with the present invention are disclosed in U.S. Provisional Application No. 60/203,795, filed May 10, 2000 and entitled "Protection Circuit and Charge Control for Lithium-Ion Batteries," and in U.S. Provisional Application No. 60/202,150, filed May 3, 2000, entitled "Lithium-Ion Shunt Protection Integrated Circuit" the entirety of which is incorporated herein by reference. In addition, any voltage regulator known in the art and suitable for use in similar battery charging circuits may be used as the voltage protection circuit 206.

Figure 5:
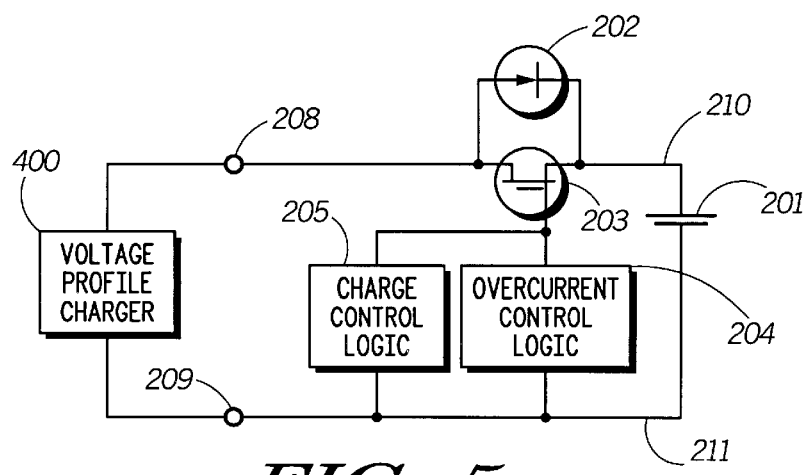
FIG. 5 is a schematic diagram of a battery circuit in accordance with another embodiment of the invention.

Reference is now made to FIG. 5. In an alternate embodiment of the present invention, instead of or in addition to the voltage protection circuit 206, a charge or power supply system having a limited output voltage is used (hereinafter called a limited voltage charger). Any limited voltage charger is useful in accordance with this embodiment of the invention, such as a constant current constant voltage (CCCV) charger. Another example of a limited voltage charger is a voltage profile charger as disclosed in U.S. Application Ser. No. 09/562,267, filed Apr. 28, 2000, entitled "Voltage Profile Charging Control," the entirety of which is incorporated herein by reference. A voltage profile charger is shown at reference numeral 400 in FIG. 4. The voltage profile charger operates to supply a charging current to the battery cell 201 such that the voltage at the nodes 208 and 209 is intrinsically limited to a value less than the battery cell termination voltage plus the conduction voltage of the parasitic diode. In this way, the transistor 203 may be used for bidirectional charge control without the voltage protection circuit 206.

Figure 6:
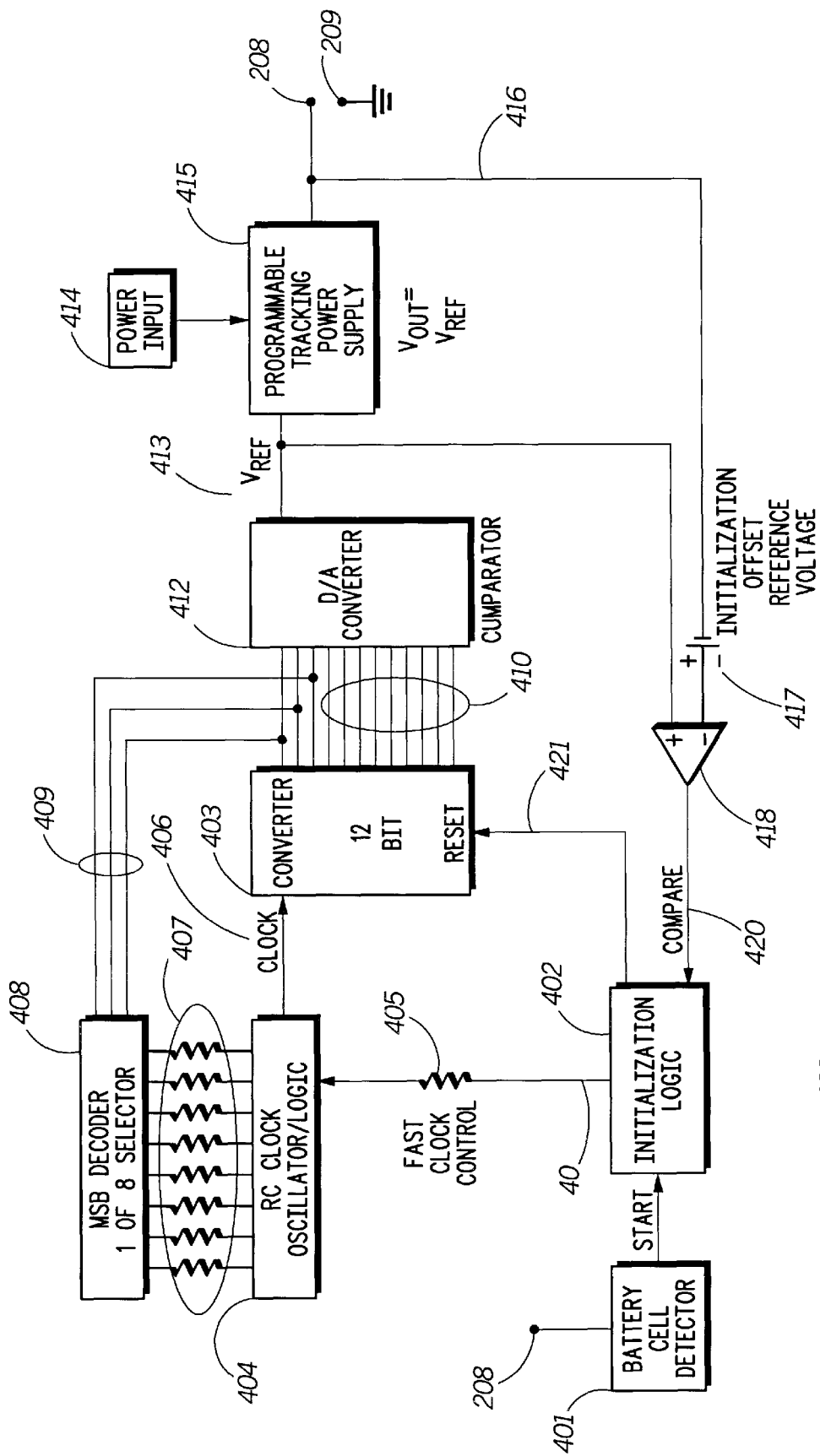
FIG. 6 is a schematic diagram of a voltage profile battery charger useful in connection with the embodiment of the invention shown in FIG. 2.

An example of a voltage profile charger 400 is shown in FIG. 6. The voltage profile charging system 400 remains in an idle state until a battery, or equivalent device, including a phone with a battery cell connected, is inserted into the charger. Upon insertion, the battery cell detector 401 momentarily toggles its output state. The initialization logic 402 then activates and does several things: First it activates a fast clock control terminal 419 which is coupled to the RC clock oscillator 404 through a current limiting resistor 405. Concurrently, the initialization logic 402 toggles a reset line 420 that acts to reset an n-bit counter (note: for exemplary purposes, this embodiment uses 12-bit counter).

The fast clock control signal causes the RC oscillator 404 to output a fast clock signal on the clock signal line 406. The term "fast clock" is intended to refer to a clock that operates in the kilohertz range. The fast clock signal present on the clock signal line 406 causes the counter 403 to begin counting at a rapid rate. As the counter output bits 410 are coupled to a digital-to-analog converter 412 (known as a "D/A converter"), the D/A output voltage 413 begins to increase in correspondence to the advancing counter.

The D/A output voltage 413 serves as a reference to a tracking power supply 415. The term "tracking power supply" is used to mean a power supply that has an output voltage proportional to a control voltage. A common example well known in the art is a circuit coupled to an energy source comprising power conversion means and closed loop voltage regulating means, such that the instantaneous output voltage of the supply is constantly regulated to accurately track the analog input control variable. This tracking is achieved essentially independent of all variables of the power conversion process, including in particular variations in input line voltage and output load current. The D/A output voltage 413 serves as the control reference, while primary power is supplied by and electrically coupled power input 414. For this embodiment, the scaling factor between reference and output is 1. Thus, the output of the tracking power supply 416 should exactly match the D/A output voltage 413.

When the input terminal 208 of the battery circuit is coupled to the output of the tracking power supply 416, the voltage at that point 416 is initially set by the battery cell. Because the counter is initially reset to zero, the D/A output voltage 413 begins initially below the voltage of the cell. (Note that this assumes that the power supply has a diode-like function causing it to operate only in the first quadrant.) This causes the comparator 418 to have an output 420 in an active low state. The counter 403, however, is counting rapidly. As the counter increases, so does the D/A output voltage 413. As soon as the D/A output voltage 413 reaches (or just exceeds) the level of the output of the tracking power supply 416, the comparator output 420 is driven into an active high state, causing the counter 403 to momentarily cease accumulating. The system 400 has now located the counter state to allow its output 416 equal to the initial battery cell voltage.

When the comparator output 420 goes high, this disables the fast clock control signal 419. With the fast clock control signal 419 disabled, the logic in the RC oscillator 404 causes the oscillator 404 to look to the frequency setting resistors 407. As shown, the decoder 408 drives these frequency-setting resistors. The decoder 408 is driven by the most significant bits (MSBs) 409 of the counter 403. With this configuration, the decoder 408 selects one of eight different clock frequencies as determined by the MSBs 409. The frequency chosen corresponds to the slope of any one individual line segment approximating a voltage profile charge curve. (It is to be understood that while this example utilizes an 8 segment piecewise linear approximation, a different number of segments would work equally well.)

To summarize, the present invention is directed to a battery charging and protection circuit that features a single transistor to control current flow in two directions. The circuit comprises first and second input terminals to which a charging current is coupled, wherein a voltage between the first and second input terminals is limited to a maximum value; first and second output terminals to which at least one rechargeable battery cell is to be coupled; a single transistor coupled in series between the first input terminal and the first output terminal and operated to control current flow both in a direction from the first input terminal to the first output terminal, and in a direction from the first output terminal to the first input terminal; a discharge regulator system coupled to the transistor, the discharge regulator system sensing a condition in which it may be desirable to control a discharge current flowing from the first output terminal to the first input terminal through the transistor and controlling the transistor accordingly; and a charge regulator system coupled to the transistor to control the transistor to regulate current flow in the direction from the first input terminal to the first output terminal.

The voltage between the first and second input terminals may be limited by one of a variety of circuits, including a voltage protection circuit or a voltage limited battery charger.

The above description is intended by way of example only.

What is claimed is:

1. A battery charging and protection circuit comprising:
   first and second input terminals to which a charging current is coupled, wherein a voltage between the first and second input terminals is limited to a maximum value;
   first and second output terminals to which at least one rechargeable battery cell is to be coupled;
   a single transistor coupled in series between the first input terminal and the first output terminal and operated to control current flow both in a direction from the first input terminal to the first output terminal, and in a direction from the first output terminal to the first input terminal;
   a discharge regulator system coupled to the transistor, the discharge regulator system sensing a condition in which it may be desirable to control a discharge current flowing from the first output terminal to the first input terminal through the transistor and controlling the transistor accordingly; and
   a charge regulator system coupled to the transistor to control the transistor to regulate current flow in the direction from the first input terminal to the first output terminal.

2. The circuit of claim 1, and further comprising a voltage protection circuit coupled between the first and second input terminals to limit the voltage therebetween to a maximum value.

3. The circuit of claim 1, wherein the single transistor is a field effect transistor (FET) having a first pole coupled to the first input terminal, a second pole coupled to the first output terminal and a gate coupled to charge regulator system and the discharge regulator system.

4. The circuit of claim 1, wherein the voltage protection circuit comprises a voltage regulator that regulates the voltage between the first and second input terminals.

5. The circuit of claim 1, wherein the voltage protection circuit comprises a transistor having first and second poles to the first and second input terminals, respectively, and a gate; and an amplifier having a first input coupled to the first terminal, a second input coupled to a reference and an output coupled to the gate of the transistor, wherein the amplifier controls the transistor to regulate current bypassing between the first and second terminals, thereby regulating voltage between the first and second input terminals.

6. The circuit of claim 5, wherein the transistor of the voltage protection circuit comprises a field effect transistor (FET).

7. The circuit of claim 1, and further comprising a battery charger coupled to the first and second input terminals for supplying charging current thereto according to a controllable voltage profile such that the voltage between the first and second input terminals is limited to the maximum value.

8. The circuit of claim 1, wherein when the discharge regulator system controls the transistor, a parasitic diode associated with the transistor is substantially reverse-biased.

9. The circuit of claim 1, wherein the discharge regulator system controls the transistor to operate it its linear ohmic, saturated or cutoff region depending on discharge conditions.

10. The circuit of claim 9, wherein the discharge regulator system controls the transistor to open circuit, thereby preventing current from the first output terminal to the first input terminal.

11. The circuit of claim 1, wherein charge regulator system controls the transistor to operate in its linear ohmic, saturated or cutoff region depending on charging conditions.

12. The circuit of claim 1, wherein when the charge regulator system controls the transistor, a parasitic diode associated with the transistor is operated below a forward voltage threshold.

13. An integrated rechargeable battery pack comprising the circuit of claim 1, and further comprising at least one rechargeable battery cell coupled to the first and second output terminals.

14. The circuit of claim 1, wherein the design of the transistor is optimized by silicon doping or other means so as to maximize its parasitic diode forward characteristics to extend its useful operating range for bi-directional current control.

* * * * *